United States Patent
Huang (10) Patent No.: US 8,108,970 B2
(45) Date of Patent: Feb. 7, 2012

(54) HINGE MECHANISM AND AN ELECTRONIC DEVICE THEREWITH

(75) Inventor: Chieh Huang, Shulin (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 286 days.

(21) Appl. No.: 12/510,383

(22) Filed: Jul. 28, 2009

(65) Prior Publication Data

US 2011/0023272 A1  Feb. 3, 2011

(51) Int. Cl.
*E05D 11/08* (2006.01)
(52) U.S. Cl. .......................................... 16/337; 16/358
(58) Field of Classification Search .................. 16/367, 16/386, 338–340, 330, 303, 380, 337, 357–360; 361/679.06, 679.27, 679.28, 679.11, 679.12, 361/679.13; 379/433.12, 433.13; 455/575.1, 455/575.4, 575.8, 550.1, 90.3; 348/373, 348/333.06, 794; 248/291.1, 292.12, 292.13, 248/919–923
See application file for complete search history.

(56) References Cited

U.S. PATENT DOCUMENTS

| | | | | |
|---|---|---|---|---|
| 3,368,237 A * | 2/1968 | Bierlich | ......................... | 16/358 |
| 3,626,548 A * | 12/1971 | Grunert | ......................... | 16/358 |
| 4,589,659 A * | 5/1986 | Yokoi et al. | ..................... | 463/34 |
| 4,960,256 A * | 10/1990 | Chihara et al. | ............. | 248/286.1 |
| 5,168,426 A * | 12/1992 | Hoving et al. | ........... | 361/679.09 |
| 5,941,615 A * | 8/1999 | Ito et al. | ......................... | 312/7.2 |
| 6,119,879 A * | 9/2000 | Acchione | ........................ | 211/99 |
| 6,714,403 B2 * | 3/2004 | Furuki et al. | ............. | 361/679.09 |
| 7,065,835 B2 * | 6/2006 | Kuramochi | ..................... | 16/357 |
| 7,107,084 B2 * | 9/2006 | Duarte et al. | ............. | 455/575.3 |
| 7,278,184 B2 * | 10/2007 | Kuramochi | ..................... | 16/357 |
| 7,669,287 B2 * | 3/2010 | Lee et al. | ........................ | 16/340 |
| 2006/0139862 A1 * | 6/2006 | Wang et al. | ................... | 361/681 |

* cited by examiner

*Primary Examiner* — Chuck Y. Mah (74) *Attorney, Agent, or Firm* — Pai Patent & Trademark Law Firm; Chao-Chang David Pai (57) ABSTRACT

A hinge mechanism has at least one hinge assembly, a rail assembly and a sliding bracket. The hinge assembly has a hinge and a lifting seat. The hinge is adapted to pivotally connect a cover and a base of an electronic device. The lifting seat is attached to the cover and has a recess. The rail assembly has at least one rail seat having a rail slot. The sliding bracket is adapted to be deposited an input unit, is movably mounted between the hinge assembly and the rail assembly and has at least one upper sliding shaft and at least one lower sliding shaft. The upper and lower sliding shafts are respectively mounted in the recess and the rail slot. A side of the sliding bracket would be elevated by the lifting seat to allow the sliding bracket to be inclined to the cover, whereby the input unit is convenient for use.

13 Claims, 11 Drawing Sheets

HINGE MECHANISM AND AN ELECTRONIC DEVICE THEREWITH

BACKGROUND OF THE INVENTION

1. Field of the Invention

The present invention relates to a hinge mechanism, particularly to a hinge mechanism that is mounted between a cover and a base of an electronic device and comprises a sliding bracket capable of being selectively inclined to the cover of the electronic device and at an angle to the base, to allow a component deposited thereon convenient for use.

2. Description of the Prior Arts

Clamshell electronic devices, such as portable computers, phones and the like have a base and a cover comprising a display and mounted pivotally on the base. Therefore, at least one hinge is required to connect the cover and the base.

The base usually comprises an input unit, such as keyboard, touch panel or the like, securely mounted on the base. However, when a keyboard is mounted in the base, the keyboard is disposed parallel with a surface on which the portable computer is mounted so ergonomic interaction with the keyboard is non-ideal.

Although a conventional portable computer is provided with a retractable structure to elevate an edge of the conventional portable computer so slanting a keyboard for improved ergonomic interaction, operation of the retractable structure complicates use of the conventional portable computer.

To overcome the shortcomings, the present invention provides a hinge mechanism to mitigate or obviate the aforementioned problems.

SUMMARY OF THE INVENTION

The main objective of the present invention is to provide a hinge mechanism to allow an angle of an input unit of an electronic device to be adjustable.

A hinge mechanism in accordance with the present invention comprises at least one hinge assembly, a rail assembly and a sliding bracket.

The least one hinge assembly has a hinge and a lifting seat. The hinge is adapted to pivotally connect a cover and a base and has a shaft. The lifting seat has a recess. The recess has a first end and a second end. The first end located at a distance from the shaft of the hinge. The second end is opposite to the first end and the shaft of the hinge.

The rail assembly has at least one rail seat. Each rail seat has a channel. The channel extends radially to the shaft of the hinge and has a distal end and a proximal end. The distal end is located at a distance to the shaft of the hinge. The proximal end is opposite to the distal end and located between the hinge assembly and the distal end.

The sliding bracket is movably mounted between the hinge assembly and the rail assembly and has a front side, a rear side, at least one upper sliding shaft and at least one lower sliding shaft. The rear side is opposite to the front side and located between the front side and the hinge assembly. Each upper sliding shaft protrudes from the rear side, is mounted in the recess of the lifting seat of a corresponding hinge assembly and is located at a distance from the upper sliding shaft. Each lower sliding shaft protrudes from the front side and is mounted in the channel of a corresponding rail.

In another aspect, the present invention also provides an electronic device with a hinge mechanism as described above. An electronic device in accordance with the present invention comprises a cover, a base and a hinge mechanism as described above.

The cover has a rear side. The base is pivotally connected to the cover and has a rear side. The hinge mechanism pivotally connects the cover and the base. The hinge assembly of the hinge mechanism is mounted between the rear sides of the cover and the base. The lifting seat of the hinge mechanism is securely attached to the cover. The rail assembly is mounted on the base. The sliding bracket of the hinge mechanism is movably mounted to the cover and the base respectively through the upper sliding shaft and the lower sliding shaft.

Based on the structure as described above, when a cover in combination with the lifting seat pivots to the base, the sliding bracket where an input unit is deposited would move simultaneously with the lifting seat and the cover and the rear side of the sliding bracket is elevated by the lifting seat, whereby the input unit is in an inclined configuration to the cover, which is convenient for use. Moreover, the sliding bracket is padded with the positioning block, which restrains the hinge assembly from pivoting to the base over a determined angle and allows the cover to stand aside the base without pivoting to the base over a certain angle.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
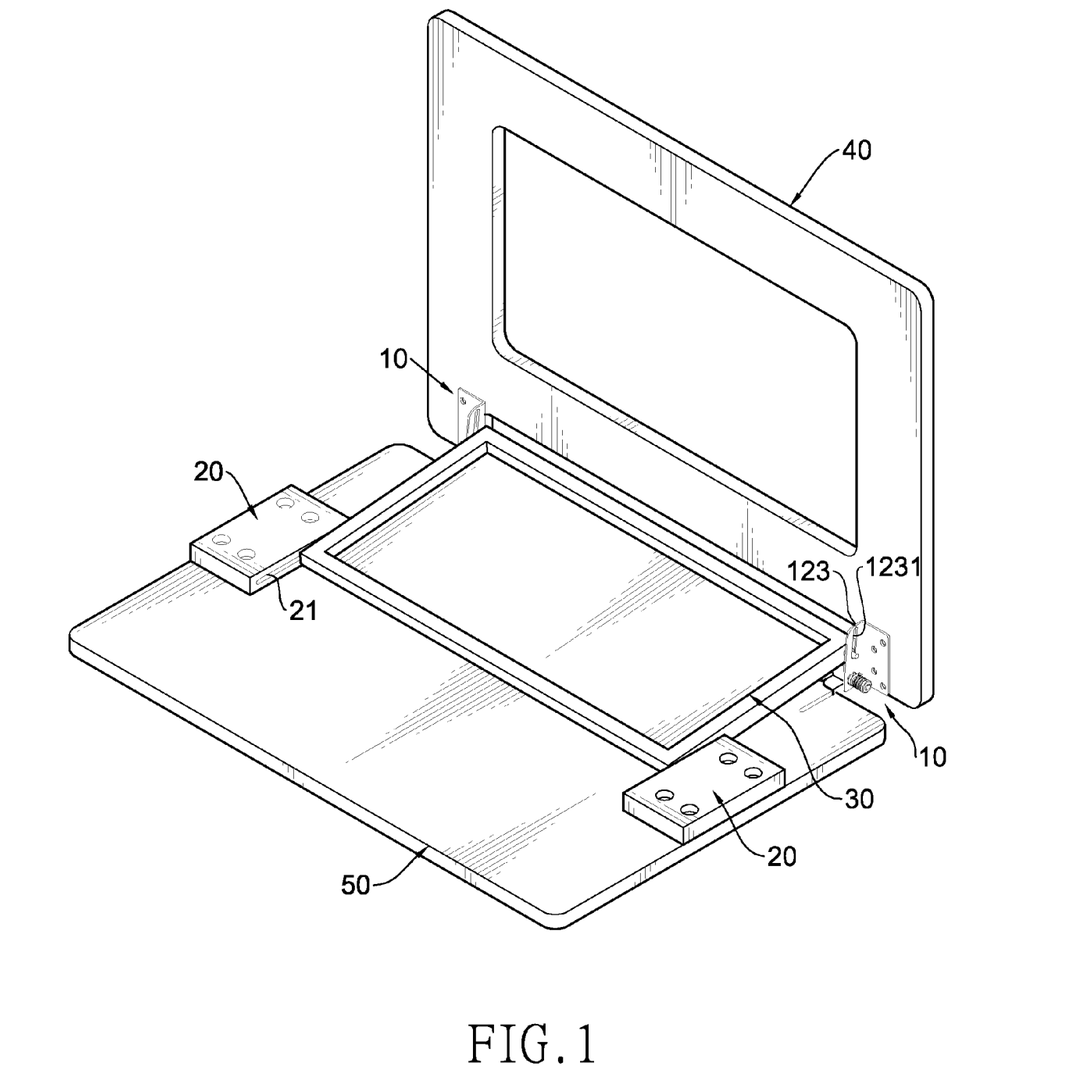
FIG. 1 is a perspective view of a first embodiment of an electronic device in accordance with the present invention.
Figure 9:
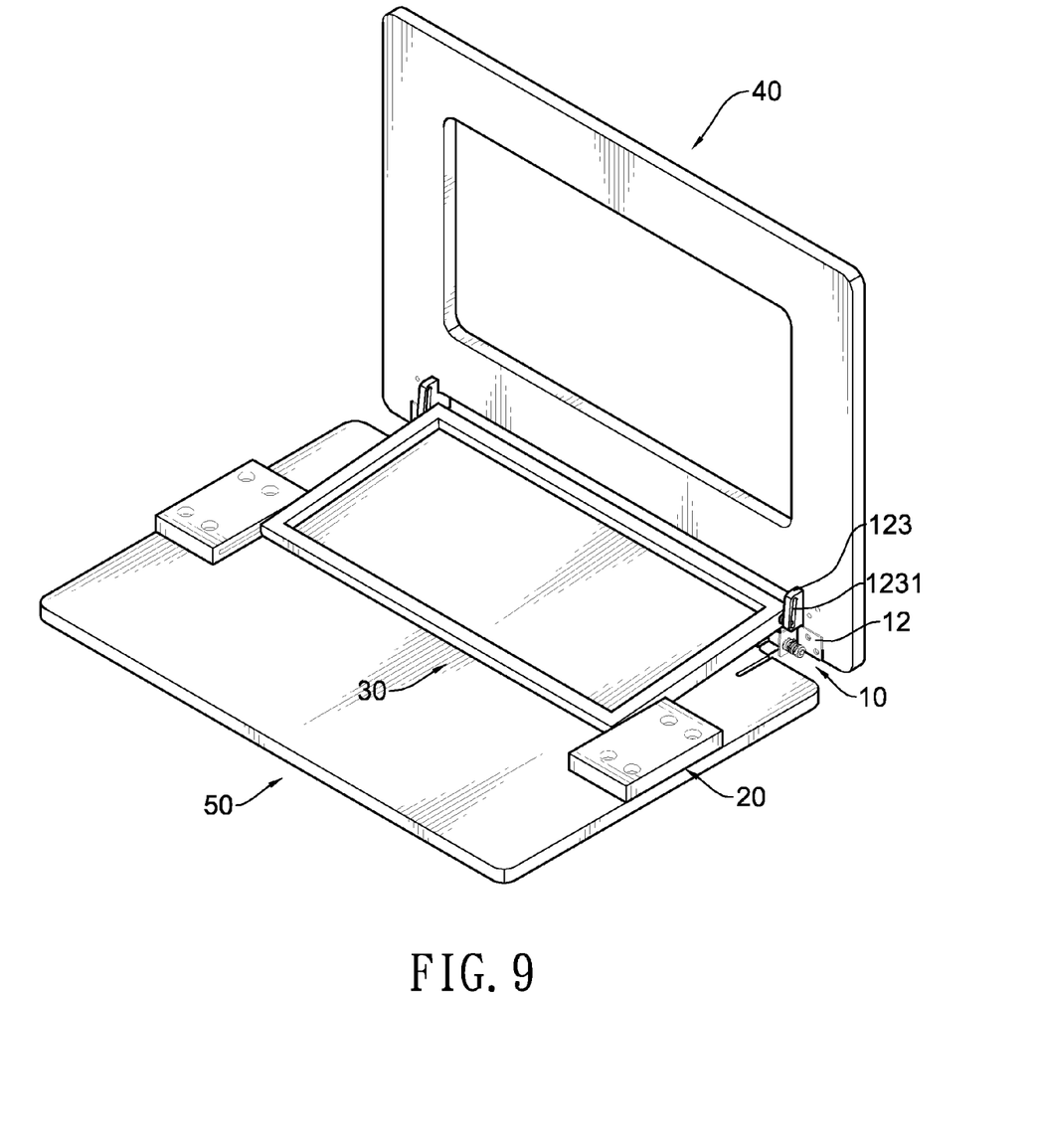
FIG. 9 is a perspective view of a second embodiment of an electronic device in accordance with the present invention.
Figure 11:
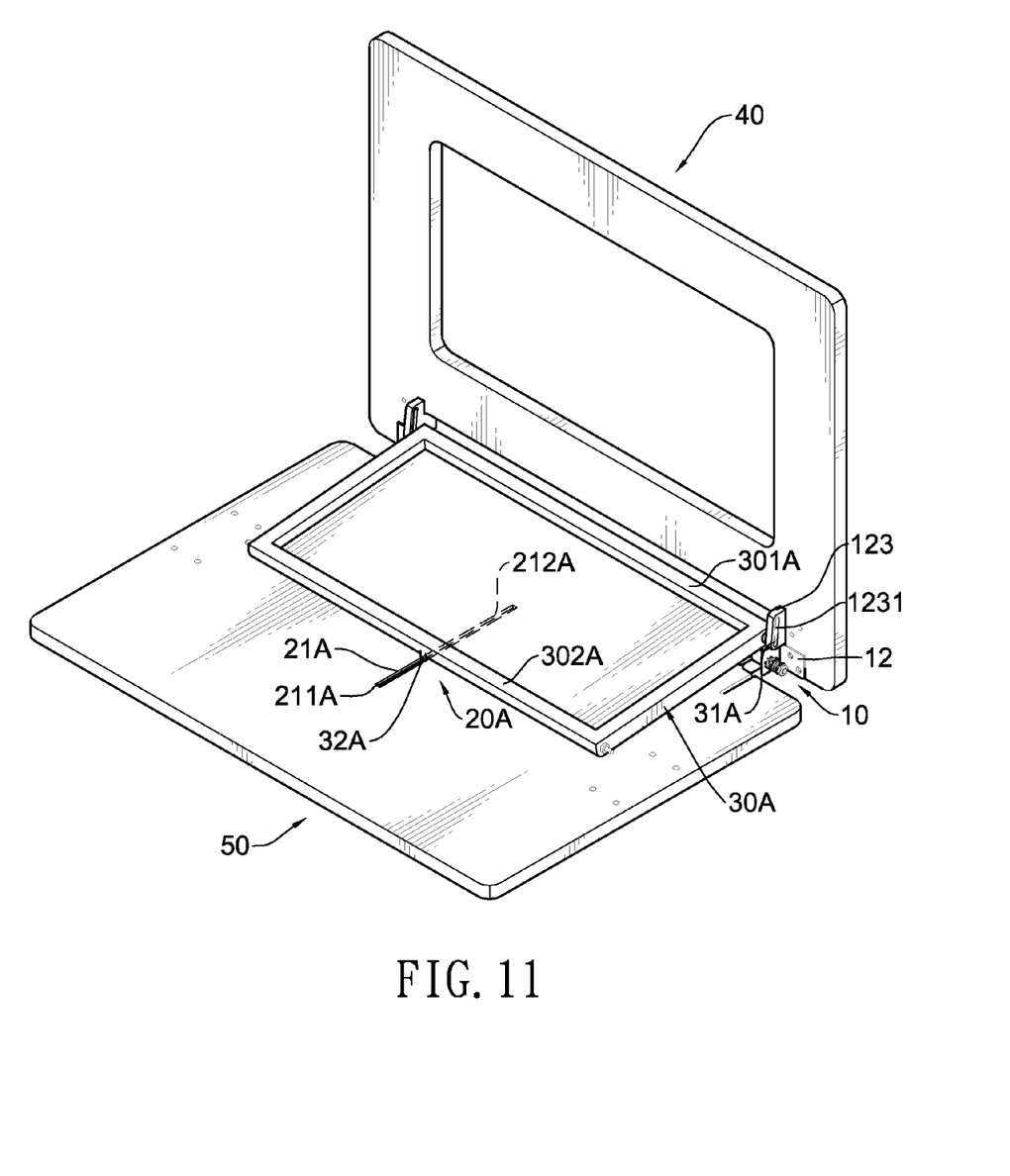
FIG. 11 is a perspective view of a third embodiment of an electronic device in accordance with the present invention.

With reference to FIGS. 1, 9 and 11, the hinge mechanism in accordance with the present invention comprises at least one hinge assembly (10), a rail assembly and a sliding bracket (30, 30A). The hinge mechanism in accordance with the present invention may comprise two hinge assemblies (10).

Figure 2:
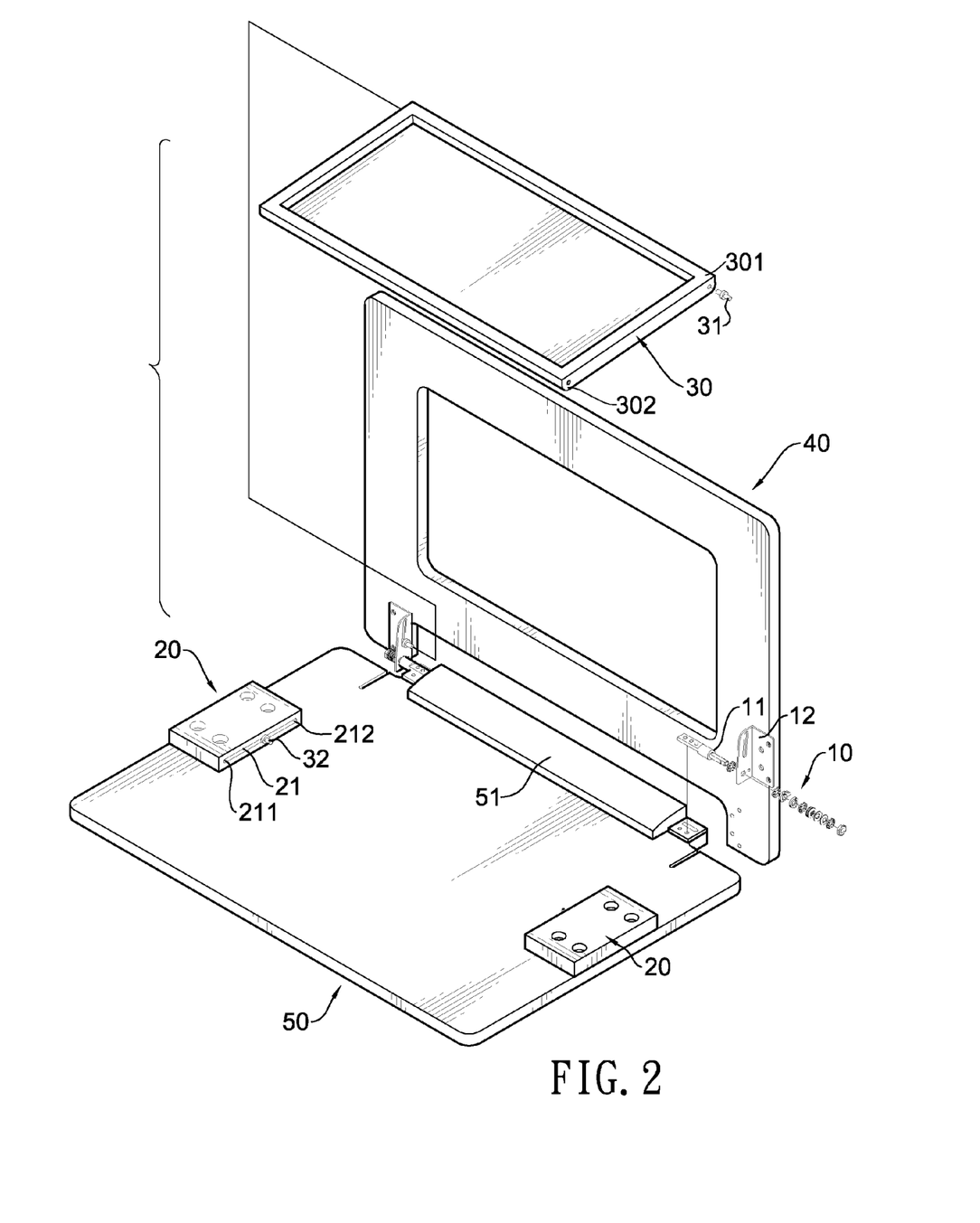
FIG. 2 is an exploded perspective view of the electronic device with the hinge mechanism in FIG. 1.
Figure 3:
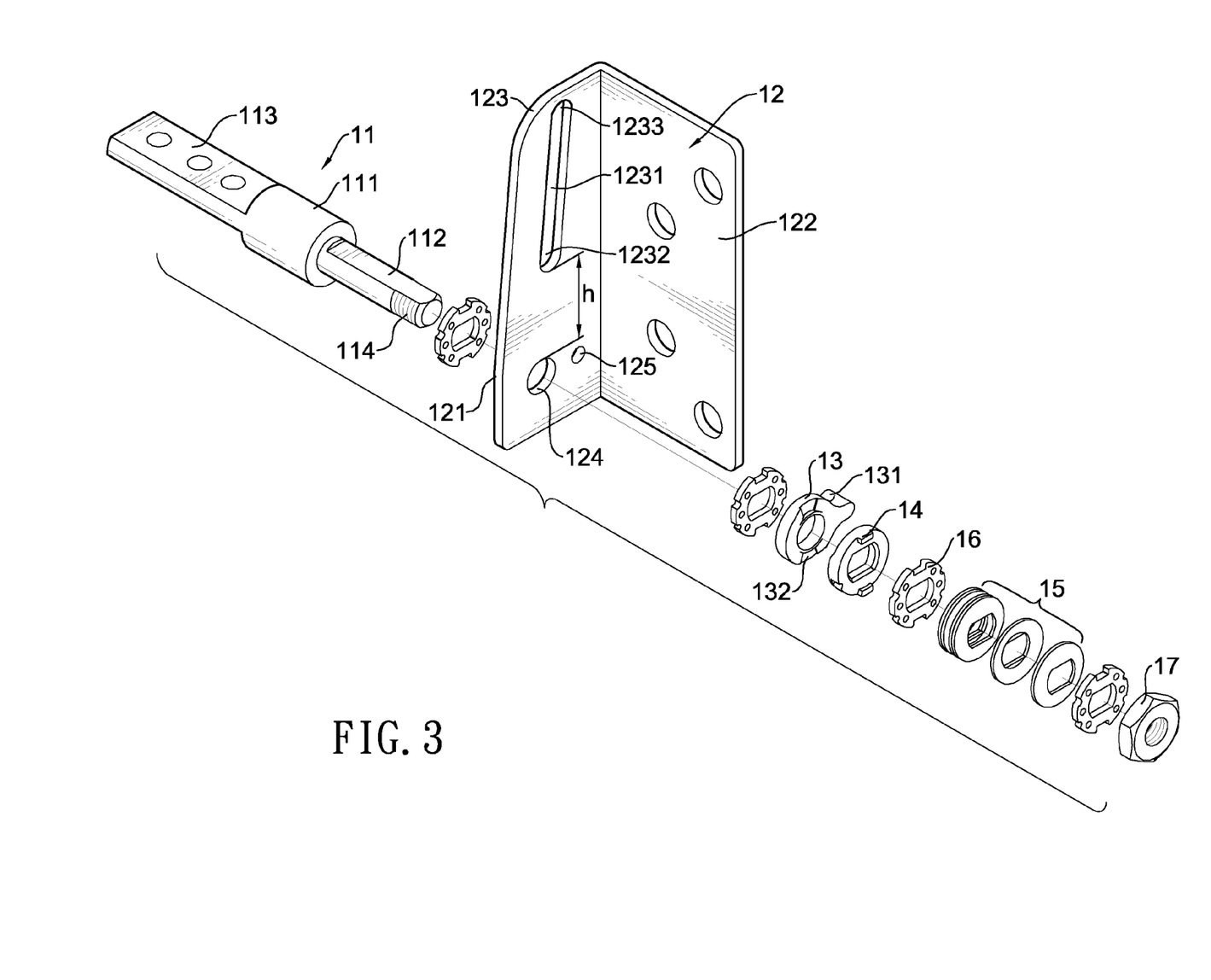
FIG. 3 is an exploded perspective view of the hinge and lifting seat in accordance with the present invention.
Figure 4:
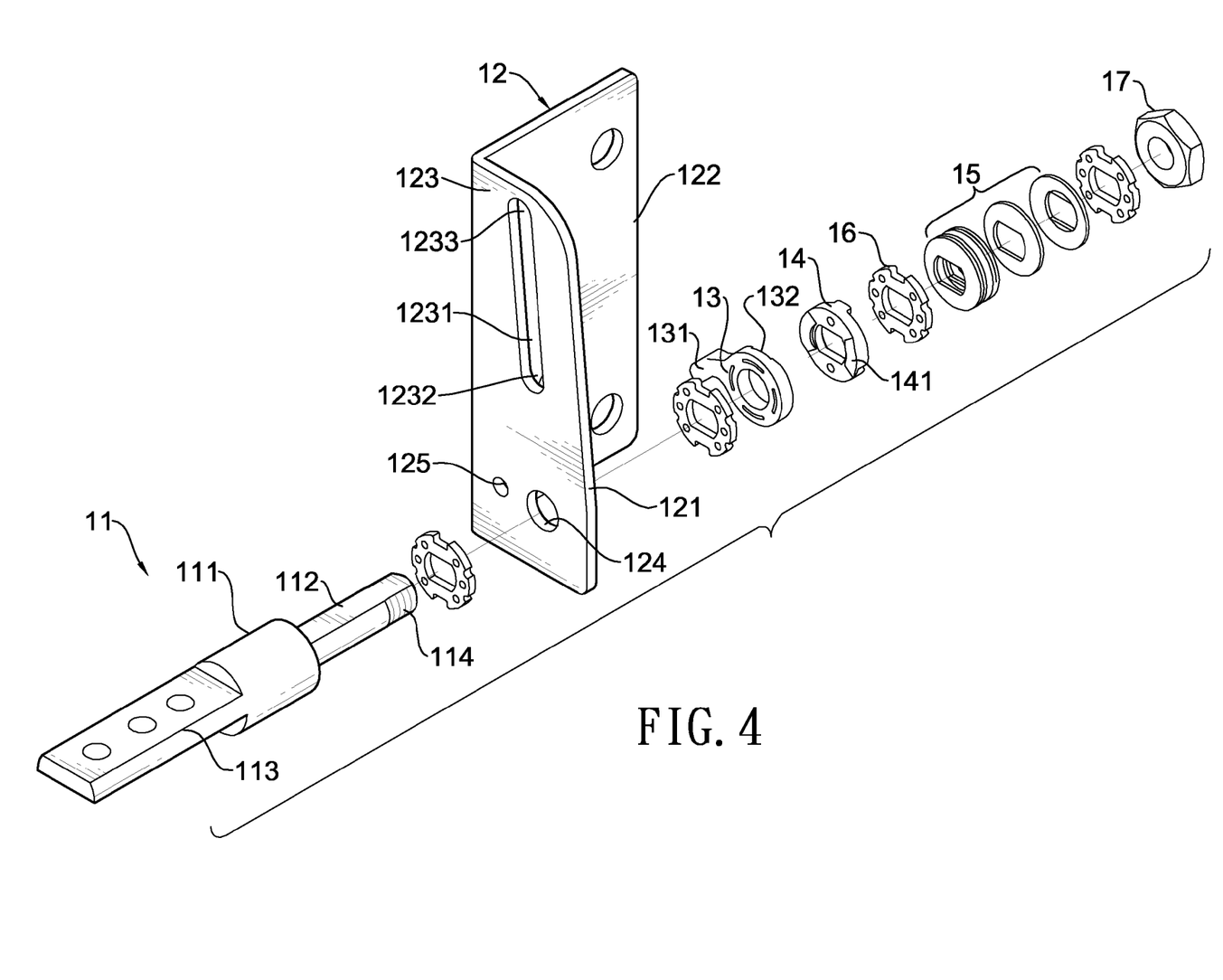
FIG. 4 is another exploded perspective view of the hinge and lifting seat in FIG. 3.

With further reference to FIGS. 2, 3 and 4, each hinge assembly (10) may have a hinge and a lifting seat (123).

The hinge has a pintle (11), a rotatable bracket (12), a moving member (13), a stationary member (14), multiple elastic members (15), multiple washers (16) and a fastener (17).

The pintle (11) has a spacer (111), a shaft (112) and a fixing leaf (113). The spacer (111) has two ends. The shaft (112) and the fixing leaf (113) respectively protrude out from the two ends. The shaft (112) has an end and a screw segment (114) formed on the end.

The rotatable bracket (12) is mounted around the shaft (112) of the pintle (11) and has an upright leaf (121) and an optional lateral leaf (122). The upright leaf (121) has a top, a sidewall, a hole (124) and an optional aperture (125). The hole (124) is formed through the sidewall and is passed through by the shaft (112). The lateral leaf (122) transversely protrudes and extends out from an edge of the sidewall.

The moving member (13) is mounted around the shaft (112) of the pintle (11), securely attached to the upright leaf (121) of the rotatable bracket (12) and has an inner surface, an outer surface, a positioning post (131) and a detent (132). The inner surface is opposite to the rotatable bracket (12). The outer surface is opposite to the inner surface. The positioning post (131) is formed on the inner surface and mounted in the aperture (125). The detent (132) is formed in the outer surface.

The stationary member (14), the elastic members (15) and the washers (16) are slidably mounted around the shaft (112) of the pintle (11). The stationary member (14) has an inner surface, an outer surface and protrusion (141). The inner surface is opposite to the moving member (13). The protrusion (141) is formed on the outer surface and engages the detent (132) of the moving member (13).

The fastener (17) is mounted around the end of the shaft (112) of the pintle (11) and securely engages the screw segment (114).

Figure 10:
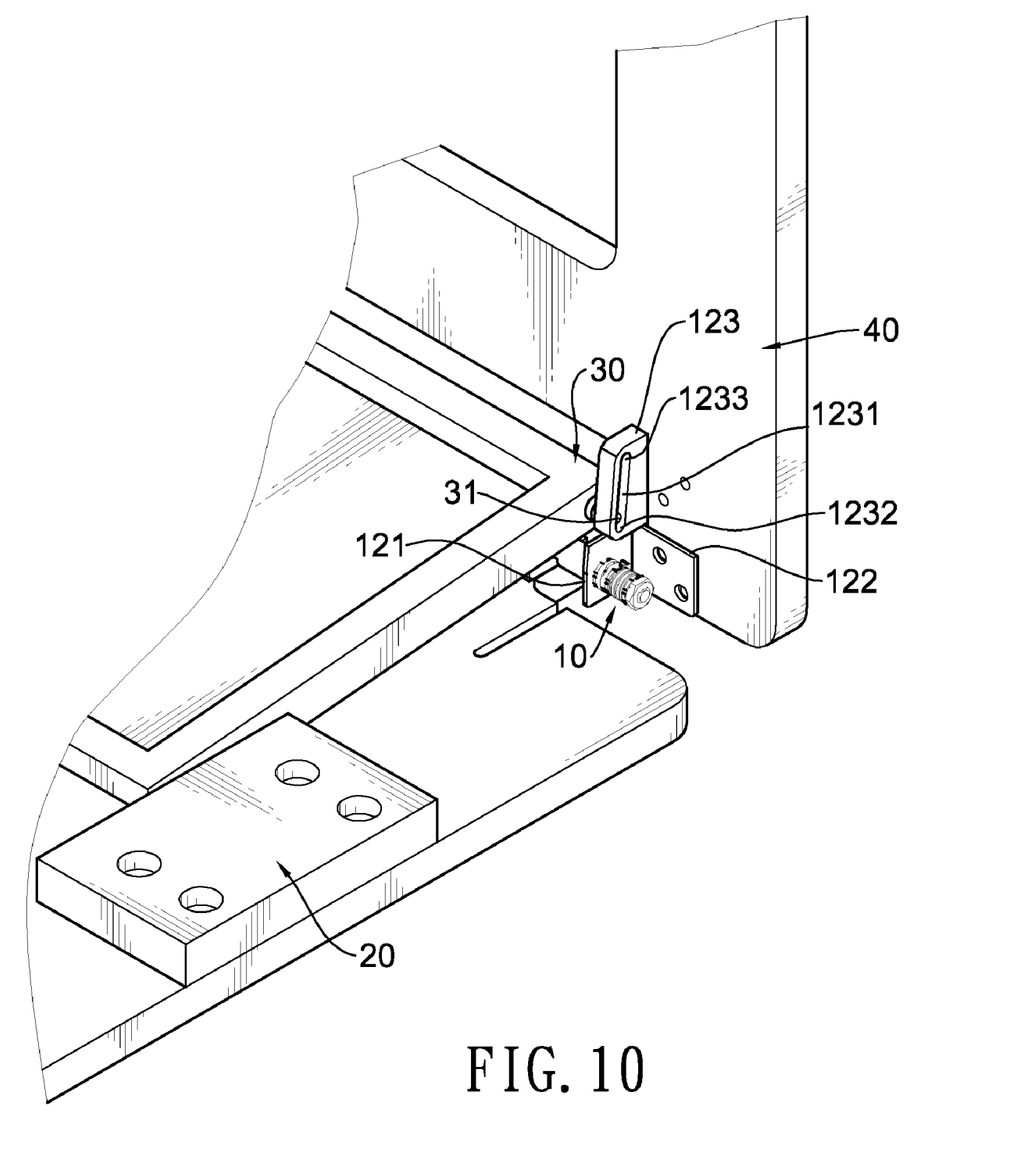
FIG. 10 is a partial enlarged perspective view of the electronic device with the hinge mechanism in FIG. 9.

With reference to FIGS. 1 and 9, the lifting seat (123) has a recess (1231). The recess (1231) may be curved or linear or in any desired shape. The shape of the recess (1231) determines if the sliding bracket (30, 30A) can slide smoothly thereon. The recess (1231) has a first end (1232) and a second end (1233). The first end (1232) is located at a distance (h) to the shaft (112) of the pintle (11) of the hinge. The second end (1233) is opposite to the first end (1232) and the shaft (112). With reference to FIGS. 1 and 3, in a preferred embodiment, the lifting seat (123) is formed integrally with the upright leaf (121). With reference to FIGS. 9 and 10, in another preferred embodiment, the lifting seat (123) is formed on and extends out from the top of the upright leaf (121).

Figure 5:
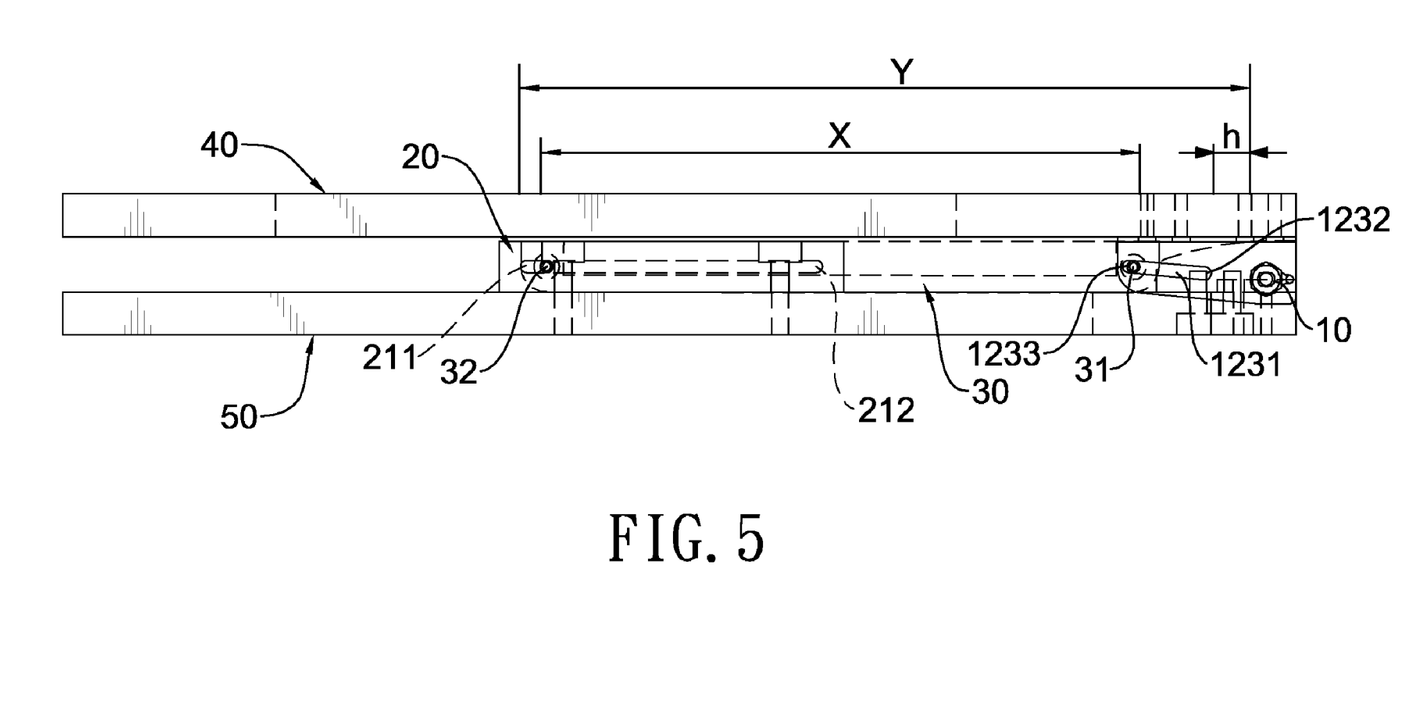
FIG. 5 is an operational side view of the electronic device with the hinge mechanism in FIG. 1 shown closed.

With reference to FIGS. 2, 5 and 11, the rail assembly has at least one rail seat (20, 20A). Each rail seat (20, 20A) is elongated and has a channel (21, 21A). The channel (21, 21A) is formed in the rail seat (20, 20A) and aligns with the diameter of the shaft (112) of the pintle (11) of the corresponding hinge assembly (10) and has a distal end (211, 211A) and a proximal end (212, 212A). The distal end (211, 211A) is located at a distance (Y) from the shaft (112) of the pintle (11) of the hinge of the hinge assembly (10). The proximal end (212, 212A) is opposite to the distal end (211, 211A) and located between the hinge assembly (10) and the distal end (211, 211A).

With reference to FIGS. 2 and 11, the sliding bracket (30, 30A) is mounted movably between the hinge assembly (10) and the rail assembly and has a sidewall, a rear side (301, 301A), a front side (302, 302A), at least one upper sliding shaft (31, 31A) and at least one lower sliding shaft (32, 32A). The rear side (301, 301A) is located near the hinge assembly (10) and between the front side (302, 302A) and the hinge assembly (10). Each upper sliding shaft (31, 31A) protrudes from the sidewall near the rear side (301, 301A) and is mounted in the recess (1231) of the lifting seat (123) of a corresponding hinge assembly (10). With further reference to FIG. 5, each lower sliding shaft (32, 32A) protrudes from the sidewall near the front side (302, 302A), is slidably mounted in the channel (21, 21A) of a corresponding rail seat (20, 20A), and is located at a distance (X) to the upper sliding shaft (31, 31A). The distance (X) plus the distance (h) is not greater than the distance (Y), namely, X+h≦Y.

Figure 8:
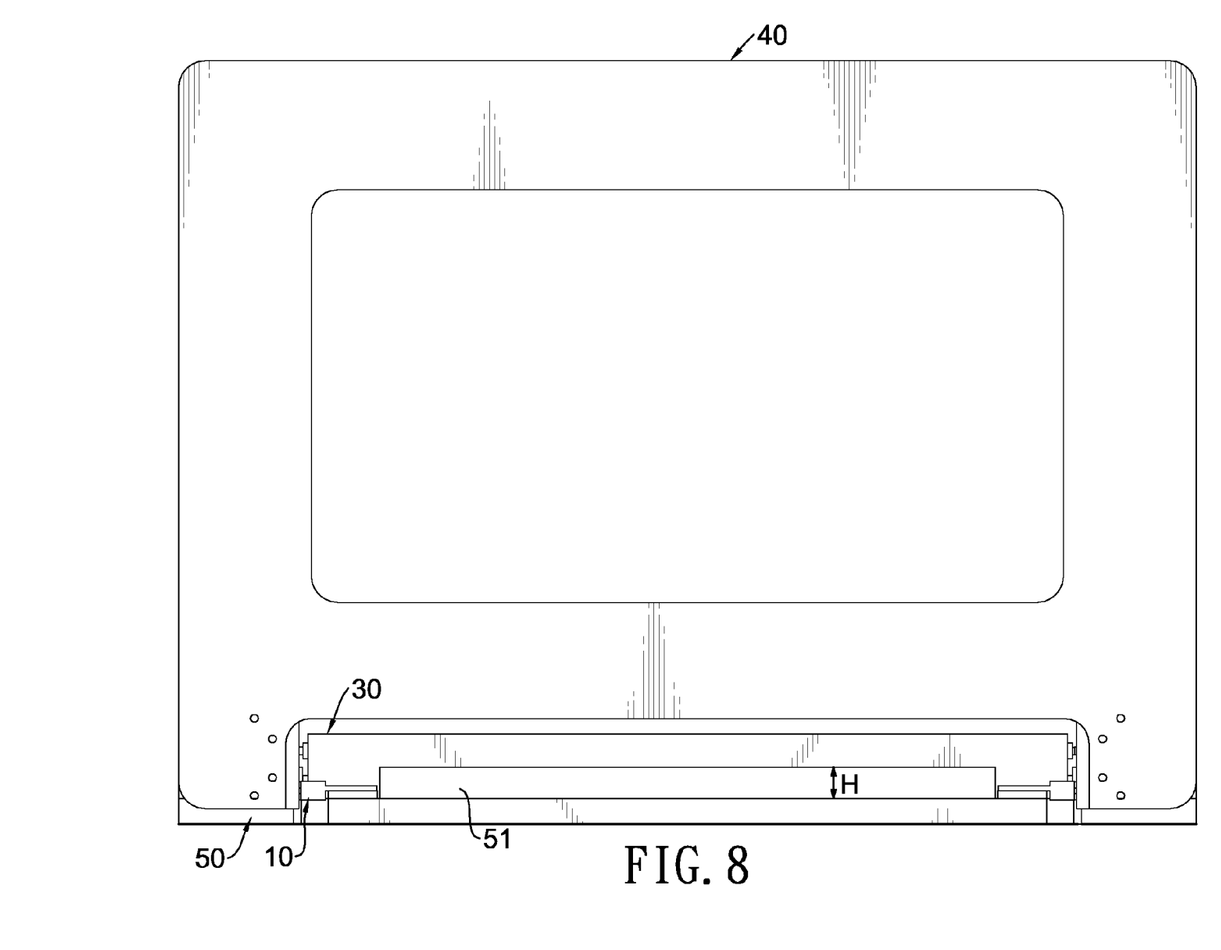
FIG. 8 is a rear view of the electronic device with the hinge mechanism in FIG. 1.

In another aspect, the present invention also provides an electronic device with the hinge mechanism comprising a cover (40), a base (50) and a hinge mechanism as described above. The cover (40) and the base (50) are pivotally connected. The base (50) has a rear side, two lateral sides and a positioning block (51). The positioning block (51) is formed adjacent to the rear side of the base and has a height (H) and two sides, with reference to FIGS. 6 and 8. Each hinge assembly (10) is mounted between the rear sides of the cover (40) and the base (50) and outside the two sides of the positioning block (51). The hinge is adapted to pivotally connect the cover (40) and the base (50). The upright leaf (121) and the lateral leaf (122) of the rotatable bracket (12) of the hinge of the hinge assembly (10) are securely attached to the cover (40) to allow the cover (40) to be pivotally mounted to the base (50). The lifting seat (123) of the hinge assembly (10) is integrally formed on the cover as shown in FIG. 10 or attached to the cover (40) as shown in FIG. 3. The rail seat (20) of the rail assembly is mounted on the base (50). The sliding bracket (30) is movably mounted between the hinge assembly (10) and the rail seat (20) of the rail assembly, also between the cover and the base, and is adapted to be mounted with an input unit such as keyboard, touch panel or other suitable devices. The rear side of the sliding bracket selectively abuts the positioning block (51) to allow the sliding bracket (30) to attain an inclined configuration to the cover and the cover pivot to the base at a limited angel.

As shown in FIGS. 1 and 2, when two hinge assemblies (10) and two rails (21) of the rail assembly are implemented, in the hinge mechanism of the electronic device in accordance with the present invention, the channels (21, 21A) of the two rails (21) are opposite each other. The sliding bracket (30, 30A) comprises two upper sliding shafts (31, 31A) and one or more lower sliding shafts (32, 32A). The two upper sliding shafts (31, 31A) are respectively mounted in the recesses (1231) of the lifting seats (123) of the two hinge assemblies (10). Each lower sliding shaft (32, 32A) is mounted in the channel (21, 21A) of the corresponding rail seat (20, 20A).

As shown in FIG. 5, when the cover (40) are closed relative to the base (50), the lifting seat (123) abuts the base (50) and the first end (1232) and the second end (1233) of the recess (1231) of the lifting seat (123) are close to the base (50). The sliding bracket (30) is located among the cover (40), the base (50) and the rail assembly and the rear side (301) and the front side (302) abut the base (50).

Figure 6:
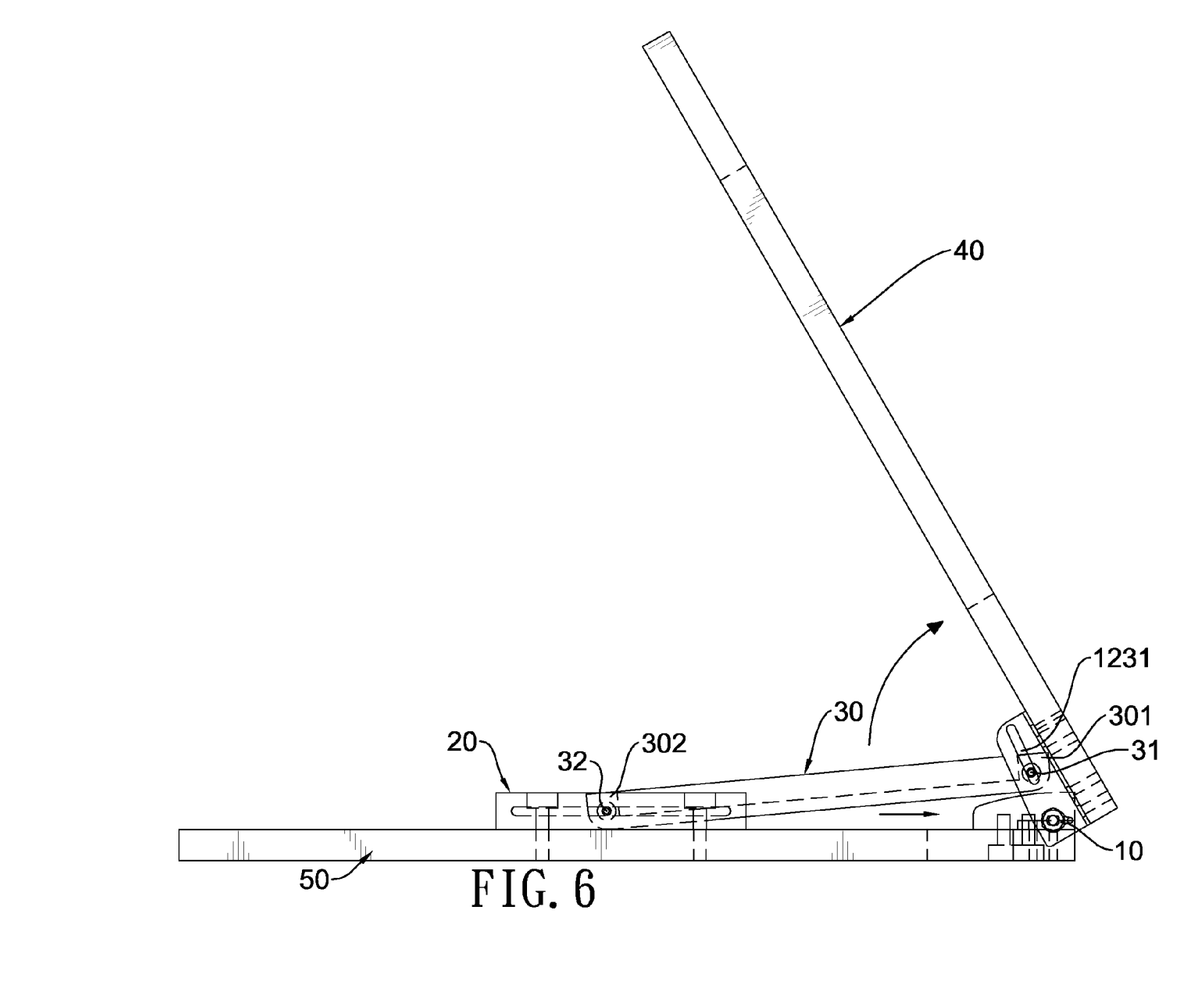
FIG. 6 is another operational side view of the electronic device with the hinge mechanism in FIG. 1 shown partially opened.
Figure 7:
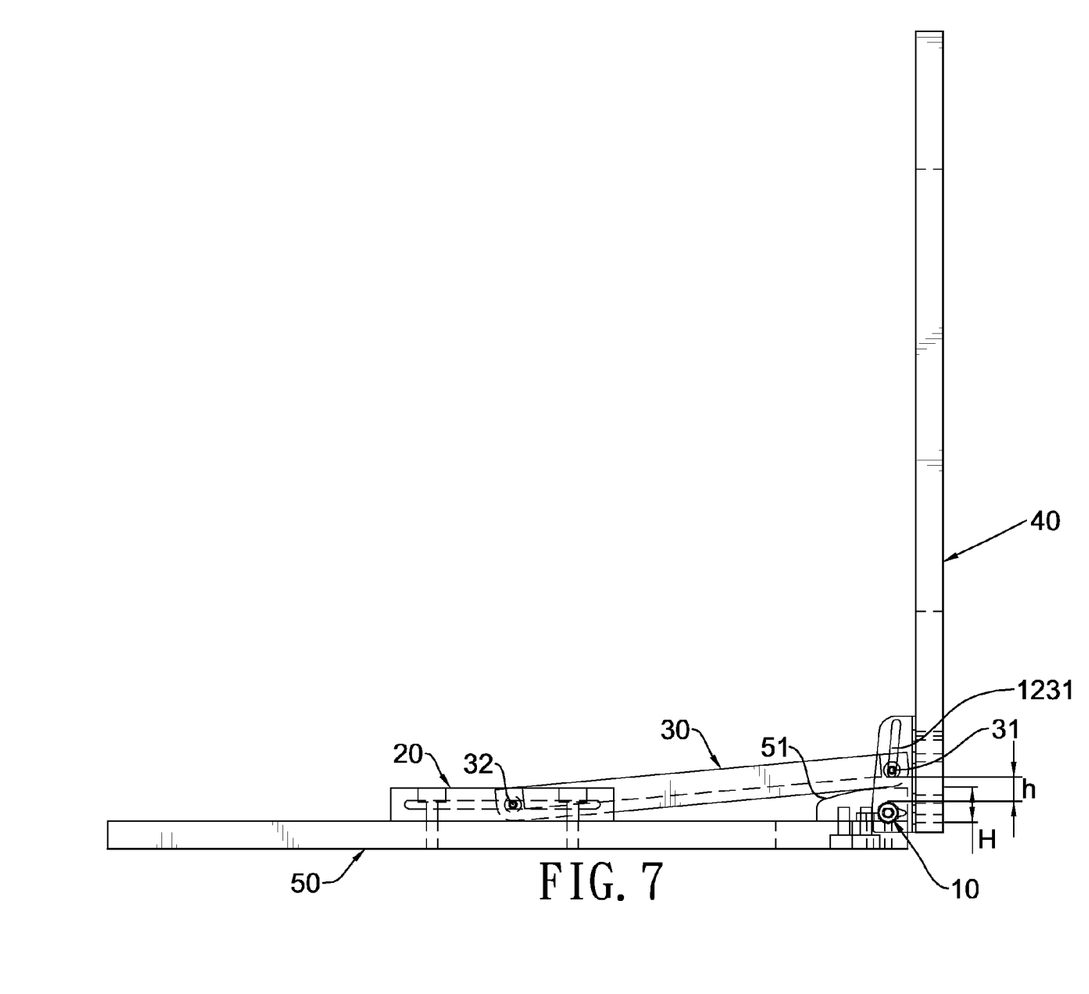
FIG. 7 is another operational side view of the electronic device with the hinge mechanism in FIG. 1 shown open.

As shown in FIG. 6, when the cover (40) are opened relative to the base (50), the cover (40) pivotally moves together with the upright leaf (121) of the hinge and the lifting seat (123) of the hinge assembly (10), the upper sliding shaft (31) moves away from the rail seat (20) and the lower sliding shaft (32) moves toward the proximal end (212) of the channel (21), whereby the rear side (301) of the sliding bracket (30) is elevated higher than the front side (302) of the sliding bracket (30) to allow the input unit being mounted between the cover (40) and the base (50) to be inclined to the cover (40).

As shown in FIGS. 1 and 2, an extent of the sliding bracket (30) inclined to the base (50) is restrained by the distance (h) of the first end (1232) of the recess (1231) of the lifting seat (123). However, the rotatable bracket (12) of the hinge assembly (10) is rotated to an angle to the base (50) over 90°, the height of the rear side (301) is decreased. Because the sliding bracket (30) selectively presses against to the positioning block (51) and inclines to the cover (40), the height of the rear side (301) to the front side (302) is no less than the distance (H). Therefore, the angle of the input unit to the base (50) is determined by the distances (h) and (H).

Based on the structure as described above, when the cover (40) pivots to the base (50), the sliding bracket (30, 30A) where the input unit is deposited would move simultaneously and finally the input unit is in an inclined configuration to the cover (40), which is convenient for use. Moreover, the sliding bracket (30, 30A) is padded with the positioning block (51), which restrains the hinge assembly (10) from pivoting to the base (50) over a determined angle and allow the cover (40) to stand aside the base (50) without pivoting to the base (50) over a certain angle.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge mechanism comprising
   at least one hinge assembly, each one of the at least one hinge assembly having
      a hinge having
         a shaft; and
      a lifting seat being connected to the shaft of a corresponding hinge assembly and having
         a recess having
            a first end located at a distance to the shaft; and
            a second end being opposite to the first end and the shaft;
   a rail assembly having
      at least one rail seat, each one of the at least one rail seat having
         a channel aligning with a diameter of the shaft of the hinge of a corresponding hinge assembly and having
            a distal end located at a distance from the shaft of the hinge; and
            a proximal end opposite to the distal end and located between the corresponding hinge assembly and the distal end; and
   a sliding bracket movably mounted between the at least one hinge assembly and the rail assembly and having
      a front side;
      a rear side opposite to the front side and located between the front side and the at least one hinge assembly;
      at least one upper sliding shaft protruding from the rear side, each one of the at least one upper sliding shaft mounted in the recess of the lifting seat of a corresponding hinge assembly; and
      at least one lower sliding shaft protruding from the front side and each one of the at least one lower sliding shaft mounted in the channel of a corresponding rail seat of the rail assembly and located at a distance to the upper sliding shaft;
      wherein the sum of the distance between the upper sliding shaft and the lower sliding shaft and the distance between the first end of the recess of the lifting seat and the shaft of the hinge is not greater than the distance between the distal end of the channel of the rail seat and the shaft of the hinge of the hinge assembly.

2. The hinge mechanism of the claim 1, wherein
   each hinge comprises
      a rotatable bracket being mounted around the shaft of the hinge and having
         an upright leaf having
            a top;
            a sidewall; and
            a hole formed through the sidewall and passed through by the shaft.

3. The hinge mechanism of the claim 2, wherein the lifting seat is formed on and extends out from the top of the upright leaf of the rotatable bracket.

4. The hinge mechanism of the claim 3, wherein the recess is curved.

5. An electronic device with a hinge mechanism comprising
   a cover having a rear side and two lateral sides;
   a base having a rear side; and
   a hinge mechanism as claimed in claim 1 pivotally connecting the cover and the base,
   wherein the hinge of the at least one hinge assembly of the hinge mechanism is mounted between the rear sides of the cover and the base;
   the lifting seat of the at least one hinge assembly of the hinge mechanism is securely attached to the cover;
   the rail assembly of the hinge mechanism is mounted on the base; and
   the sliding bracket of the hinge mechanism is movably mounted to the cover and the base respectively through the at least one upper sliding shaft and the at least one lower sliding shaft.

6. The electronic device with a hinge mechanism of claim 5, wherein
   the at least one hinge assembly comprises two hinge assemblies; and
   the sliding bracket has two upper sliding shafts respectively corresponding to the two hinge assemblies.

7. The electronic device with a hinge mechanism of claim 6, wherein
   the base further comprises
      a positioning block formed adjacent to the rear side of the base and between the two hinge assemblies; and
   the rear side of the sliding bracket selectively abuts the positioning block to allow the sliding bracket to attain an inclined configuration to the cover and the cover pivoting to the base at a limited angle.

8. The electronic device with a hinge mechanism of claim 7, wherein
   the rail assembly comprises
      two rails opposite each other; and
   the sliding bracket comprises
      two lower sliding shafts, each lower sliding shaft movably mounted in the channel of the corresponding rail seat.

9. The electronic device with a hinge mechanism of claim 5, wherein
   the hinge of each hinge assembly has
   a rotatable bracket being mounted around the shaft of the hinge and having
      an upright leaf having
         a top;
         a sidewall; and
         a hole formed through the sidewall and passed through by the shaft; and
   the lifting seat is formed on and extends out from the top of the upright leaf of the rotatable bracket.

10. An electronic device with a hinge mechanism, comprising
- a cover having a rear side and two lateral sides;
- a base having a rear side; and
- a hinge mechanism as claimed in claim 2 pivotally connecting the cover and the base,
- wherein the hinge of the at least one hinge assembly of the hinge mechanism is mounted between the rear sides of the cover and the base;
- the lifting seat of the at least one hinge assembly of the hinge mechanism is securely attached to the cover;
- the rail assembly of the hinge mechanism is mounted on the base; and
- the sliding bracket of the hinge mechanism is movably mounted to the cover and the base respectively through the at least one upper sliding shaft and the at least one lower sliding shaft.

11. The electronic device with a hinge mechanism of claim 10, wherein
- the at least one hinge assembly comprises two hinge assemblies; and
- the sliding bracket has two upper sliding shafts respectively corresponding to the two hinge assemblies, each upper sliding shaft movably mounted in the recess of the lifting seat of the corresponding hinge assembly.

12. The electronic device with a hinge mechanism of claim 11, wherein
- the base further comprises
  - a positioning block formed adjacent to the rear side of the base and between the two hinge assemblies; and
- the rear side of the sliding bracket selectively abuts the positioning block to allow the sliding bracket to attain an inclined configuration to the cover and the cover pivoting to the base at a limited angle.

13. The electronic device with a hinge mechanism of claim 12, wherein
- the rail assembly comprises
  - two rails opposite each other; and
- the sliding bracket comprises
  - two lower sliding shafts, each lower sliding shaft movably mounted in the channel of the corresponding rail seat.

* * * * *